United States Patent
Awano et al.

(10) Patent No.: US 12,173,774 B2
(45) Date of Patent: Dec. 24, 2024

(54) SHOCK ABSORBER

(71) Applicant: KYB CORPORATION, Tokyo (JP)

(72) Inventors: Koichiro Awano, Tokyo (JP); Takahisa Mochizuki, Tokyo (JP); Masashi Uemura, Tokyo (JP)

(73) Assignee: KYB Corporation, Tokyo (JP)

( * ) Notice: Subject to any disclaimer, the term of this patent is extended or adjusted under 35 U.S.C. 154(b) by 620 days.

(21) Appl. No.: 17/434,650

(22) PCT Filed: Feb. 28, 2020

(86) PCT No.: PCT/JP2020/008372
§ 371 (c)(1),
(2) Date: Mar. 10, 2022

(87) PCT Pub. No.: WO2020/179676
PCT Pub. Date: Sep. 10, 2020

(65) Prior Publication Data
US 2023/0109503 A1 Apr. 6, 2023

(30) Foreign Application Priority Data

Mar. 4, 2019 (JP) ................ 2019-038130

(51) Int. Cl.
*F16F 9/34* (2006.01)
*F16F 9/18* (2006.01)
(Continued)

(52) U.S. Cl.
CPC .............. *F16F 9/516* (2013.01); *F16F 9/185* (2013.01); *F16F 9/44* (2013.01);
(Continued)

(58) Field of Classification Search
CPC .... F16F 9/065; F16F 9/44; F16F 9/185; F16F 9/516; F16F 2222/12; F16F 2228/066; F16F 2234/02; B62K 25/08; B62K 2025/048
(Continued)

(56) References Cited

U.S. PATENT DOCUMENTS

| | | | |
|---|---|---|---|
| 4,212,484 A * | 7/1980 | Fujii | B60G 17/0152 280/43.23 |
| 5,662,046 A * | 9/1997 | Wright | F16F 9/512 105/198.3 |

(Continued)

FOREIGN PATENT DOCUMENTS

| | | |
|---|---|---|
| JP | H05-302638 A | 11/1993 |
| JP | H10-026168 A | 1/1998 |

(Continued)

OTHER PUBLICATIONS

May 25, 2023, German Office Action issued for related DE Application No. 112020001062.7.

(Continued)

*Primary Examiner* — Christopher P Schwartz
(74) *Attorney, Agent, or Firm* — Paratus Law Group, PLLC

(57) ABSTRACT

A shock absorber includes a hard-side damping element for applying resistance to a flow of liquid from a compression side chamber to an extension side chamber, a solenoid valve capable of changing an opening area of a compression side bypass passage for communicating the compression side chamber and the extension side chamber by bypassing the hard-side damping element, and a soft-side damping element provided in the compression side bypass passage in series with the solenoid valve. The hard-side damping element has an orifice and a leaf valve provided in parallel (Continued)

with the orifice. The soft-side damping element has an orifice having an opening area larger than that of the orifice.

6 Claims, 8 Drawing Sheets

(51) Int. Cl.
    *F16F 9/44*       (2006.01)
    *F16F 9/516*     (2006.01)
    *B62K 25/04*     (2006.01)
    *B62K 25/08*     (2006.01)
    *F16F 9/06*      (2006.01)

(52) U.S. Cl.
    CPC ........ *B62K 2025/048* (2013.01); *B62K 25/08* (2013.01); *F16F 9/065* (2013.01); *F16F 2222/12* (2013.01); *F16F 2228/066* (2013.01); *F16F 2232/08* (2013.01); *F16F 2234/02* (2013.01)

(58) Field of Classification Search
    USPC ......... 188/282.7, 322.13, 322.15, 322.2, 318
    See application file for complete search history.

(56) References Cited

U.S. PATENT DOCUMENTS

| | | | | |
|---|---|---|---|---|
| 7,699,147 | B2* | 4/2010 | Preukschat | B60G 17/04 |
| | | | | 188/282.4 |
| 7,740,263 | B2 | 6/2010 | Inaguma | |
| 9,683,625 | B2* | 6/2017 | Kurita | F16F 9/512 |
| 9,834,054 | B2* | 12/2017 | Teraoka | F16F 9/5126 |
| 9,994,239 | B2* | 6/2018 | Haller | F16F 9/46 |
| 11,285,774 | B2* | 3/2022 | Hamers | B60G 13/08 |
| 2002/0121416 | A1* | 9/2002 | Katayama | F16F 9/096 |
| | | | | 188/315 |
| 2005/0145456 | A1 | 7/2005 | Tomonaga et al. | |
| 2006/0124414 | A1* | 6/2006 | Hanawa | B62K 25/08 |
| | | | | 188/314 |
| 2008/0061527 | A1 | 3/2008 | Inaguma | |
| 2013/0195689 | A1 | 8/2013 | Mochizuki | |
| 2018/0135718 | A1* | 5/2018 | Kobayashi | F16F 9/516 |
| 2022/0128117 | A1* | 4/2022 | Awano | F16F 9/19 |
| 2023/0108079 | A1* | 4/2023 | Hayashiguchi | F16F 9/3221 |
| | | | | 188/281 |

FOREIGN PATENT DOCUMENTS

| | | |
|---|---|---|
| JP | 2001-241484 A | 9/2001 |
| JP | 2005-180490 A | 7/2005 |
| JP | 2008-069830 A | 3/2008 |
| JP | 2009-257456 A | 11/2009 |
| JP | 2010-007758 A | 1/2010 |
| JP | 2010-261547 A | 11/2010 |
| JP | 2012-215189 A | 11/2012 |
| JP | 2013-133896 A | 7/2013 |
| JP | 2014-156885 A | 8/2014 |

OTHER PUBLICATIONS

Apr. 2, 2022, Chinese Office Action issued for related CN Application No. 202080009648.9.

Mar. 1, 2022, Japanese Office Action issued for related JP Application No. 2019-038130.

Oct. 8, 2022, Chinese Office Action issued for related CN Application No. 202080009648.9.

Aug. 2, 2022, Japanese Office Action issued for related JP Application No. 2019-038130.

Feb. 7, 2024, German Office Action issued for related DE Application No. 11 2020 001 062.7.

* cited by examiner

SHOCK ABSORBER

TECHNICAL FIELD

The present invention relates to an improvement of a shock absorber.

BACKGROUND ART

Some traditional shock absorbers contain a liquid such as a hydraulic fluid in a cylinder, and applies resistance by a damping element to the flow of the liquid generated when a piston moves in the cylinder to exhibit a damping force caused by the resistance.

The damping element has, for example, an orifice and a leaf valve provided in parallel with the orifice. When the piston speed is in the low speed range and the differential pressure between the upstream side and the downstream side of the damping element is less than the valve opening pressure of the leaf valve, the liquid passes only through the orifice. On the other hand, when the piston speed is in the middle and high speed range and the above differential pressure is higher than or equal to the valve opening pressure of the leaf valve, the liquid passes through the leaf valve.

Therefore, the characteristic of the damping force (hereinafter referred to as "damping force characteristic") with respect to the piston speed of the above shock absorber changes from an orifice characteristic proportional to the square of the piston speed specific to the orifice to a valve characteristic proportional to the piston speed specific to the leaf valve when the leaf valve is opened.

Some shock absorbers are provided with a bypass passage for bypassing the damping element, a needle valve for adjusting the size of the opening area of the bypass passage, and a pilot valve for controlling the back pressure of the leaf valve constituting the damping element, for the purpose of adjusting the damping force generated (for example, refer to Patent Literatures 1 and 2).

CITATION LIST

Patent Literature

Patent Literature 1: JP 2010-7758 A
Patent Literature 2: JP 2014-156885 A

SUMMARY OF INVENTION

Technical Problem

For example, in the shock absorber equipped with the needle valve described in JP 2010-7758 A, when the needle valve is driven to increase the opening area of the bypass passage, the flow rate of the liquid passing through the damping element is reduced and the damping force generated is reduced (soft mode in FIG. 7). On the contrary, when the opening area of the bypass passage is reduced, the flow rate of the liquid passing through the damping element is increased and the damping force generated is increased (hard mode in FIG. 7).

Such an adjustment of the damping force by the needle valve is mainly used for adjusting the magnitude of the damping force when the piston speed is in the low speed range. When the opening area of the bypass passage is adjusted by the above needle valve, the magnitude of the damping force when the piston speed is in the middle and high speed range is also adjusted to some extent, but the adjustment has a difficulty in increasing its adjustment width.

On the other hand, in the shock absorber equipped with the pilot valve described in JP 2014-156885 A, when the valve opening pressure of the pilot valve is reduced to reduce the back pressure of the leaf valve, the valve opening pressure of the leaf valve is reduced and the damping force generated is reduced (soft mode in FIG. 8). On the contrary, when the pilot valve opening pressure is increased to increase the back pressure of the leaf valve, the valve opening pressure of the leaf valve is increased and the damping force generated is increased (hard mode in FIG. 8).

As described above, when the back pressure of the leaf valve is controlled to change the valve opening pressure, the adjustment width of the damping force can be increased when the piston speed is in the middle and high speed range. However, in such a case, since the characteristic line illustrating the damping force characteristic in the middle and high speed range shifts up and down without changing the inclination thereof, the inclination of the characteristic line changes abruptly at the time of shifting from the low speed range to the middle and high speed range, especially in the hard mode. Therefore, mounting the shock absorber on a vehicle gives discomfort to a passenger, which may lead to deterioration of riding comfort.

Accordingly, it is an object of the present invention to solve these problems, and to provide a shock absorber capable of increasing the adjustment width of the damping force when the piston speed is in the middle and high speed range, and improving the riding comfort when mounted on a vehicle.

Solution to Problem

The shock absorber, which solves the above problems, includes a hard-side damping element for applying resistance to the flow of liquid from a compression side chamber to an extension side chamber, which are partitioned by a piston movably inserted into a cylinder, a solenoid valve capable of changing the opening area of a bypass passage for communicating the compression side chamber and the extension side chamber by bypassing the hard-side damping element, and a soft-side damping element provided in the bypass passage in series with the solenoid valve. The hard-side damping element has an orifice and a leaf valve provided in parallel with the orifice. The soft-side damping element has a large-diameter orifice.

According to the above configuration, the damping force generated by the shock absorber is an orifice characteristic specific to the orifice when the piston speed is in the low speed range, and a valve characteristic specific to the leaf valve when the piston speed is in the middle and high speed range. When the opening area of the bypass passage is changed by the solenoid valve, the distribution ratio of the flow rate passing through each of the hard-side damping element and the soft-side damping element in the liquid moving from the compression side chamber to the extension side chamber varies. Therefore, both the damping coefficient when the piston speed is in the low speed range and the damping coefficient when the piston speed is in the middle and high speed range can be freely set to increase the adjustment width of the damping force generated.

Further, in the soft mode in which the opening area of the bypass passage is increased, both the damping coefficient when the piston speed is in the low speed range and the damping coefficient when the piston speed is in the middle and high speed range can be decreased. On the contrary, in the hard mode in which the opening area of the bypass passage is reduced, both the damping coefficient when the piston speed is in the low speed range and the damping coefficient when the piston speed is in the middle and high speed range can be increased. Thus, when the damping force characteristic changes from the orifice characteristic in the low speed range to the valve characteristic in the middle and high speed range, the change in the inclination of the characteristic line can be gradual in any mode, so that when the shock absorber according to the present invention is mounted on a vehicle, the riding comfort of the vehicle can be improved.

In the above shock absorber, the soft-side damping element may have a leaf valve provided in parallel with the large-diameter orifice. Thus, even if a valve having a high valve rigidity is employed as the leaf valve of the hard-side damping element, the damping force is not excessive in the soft mode. Therefore, the adjustment width of the damping force can be further increased when the piston speed is in the middle and high speed range In the above shock absorber, the solenoid valve may be set so as to change an opening degree in proportion to an energization amount. Thus, the opening area of the bypass passage can be adjusted without steps.

In the above shock absorber, the solenoid valve may have a cylindrical holder in which a port to be connected to the bypass passage is formed, a spool reciprocatably inserted into the holder and capable of opening and closing the port, a biasing spring for biasing the spool in one of moving directions of the spool, and a solenoid for applying thrust in a direction opposite to a biasing force of the biasing spring to the spool.

According to the above configuration, the opening degree of the solenoid valve can be easily increased without increasing the stroke amount of the spool serving as the valve element of the solenoid valve, so that the adjustment width of the opening area of the bypass passage can be easily increased. Further, the above configuration can easily make the relationship between the opening degree of the solenoid valve and the energization amount into a proportional relationship having a positive proportional constant or a negative proportional relationship having a negative proportional constant.

In addition to the piston connected to an other end of a piston rod, the above shock absorber may include a tank connected to the extension side chamber, and a suction valve for permitting only a flow of liquid from the tank to the compression side chamber. According to the configuration, the shock absorber is formed into a single rod type, can compensate the volume of the piston rod moving in and out of the cylinder by the tank, and can be a single-sided shock absorber generating damping force only in the contraction stroke.

The above shock absorber may include a manual valve capable of changing the opening area of a discharge passage for communicating the compression side chamber and the tank by manual operation. According to the configuration, even if the solenoid valve is closed at the time of failure, the flow rate of the liquid passing through the hard-side damping element can be reduced when the manual valve is opened. Therefore, excessive damping force can be prevented in the failure mode, and the riding comfort of a vehicle can be improved even in the failure mode when the shock absorber is mounted on the vehicle.

Advantageous Effects of Invention

The shock absorber according to the present invention can increase the adjustment width of the damping force when the piston speed is in the middle and high speed range, and improve the riding comfort when the shock absorber is mounted on a vehicle.

DESCRIPTION OF EMBODIMENTS

Figure 1:
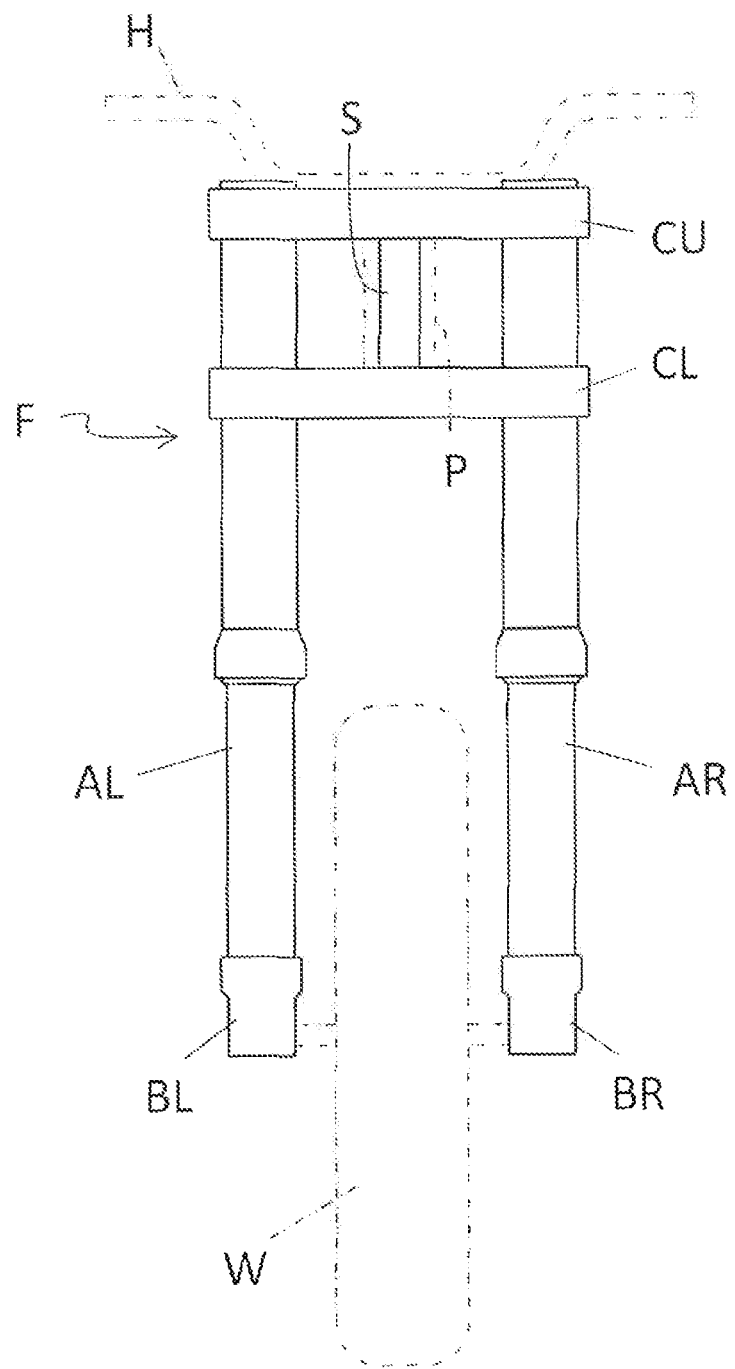
FIG. 1 is a simplified front view illustrating a mounting state of a shock absorber on the compression side, which is a shock absorber according to an embodiment of the present invention.

A shock absorber according to an embodiment of the present invention will be described below with reference to the drawings. The same reference numerals assigned throughout the several drawings denote the same or corresponding components. The shock absorber according to the embodiment of the present invention is used for a front fork suspending front wheels of a saddle-riding type vehicle. In the following description, the upper and lower sides in a state in which the front fork including the shock absorber is attached to a vehicle are simply referred to as "upper side" and "lower side" unless otherwise specified.

As illustrated in FIG. 1, a front fork F includes a pair of shock absorbers AR and AL, axle-side brackets BR and BL for connecting the lower ends of the shock absorbers AR and AL to axles of a front wheel W, respectively, and a pair of upper and lower vehicle body-side brackets CU and CL for connecting the upper ends of the shock absorbers AR and AL to each other, and the vehicle body-side brackets CU and CL are connected by a steering shaft S.

The steering shaft S is rotatably inserted into a head pipe P of a vehicle body, and a handlebar H is connected to the upper bracket CU. When the handlebar H is rotated, the entire front fork F rotates around the steering shaft S. At this point, the front wheel W rotates together with the front fork F to change its direction.

In the present embodiment, one of the pair of shock absorbers AR and AL is a shock absorber AR on the compression side for generating and adjusting a compression side damping force. The shock absorber AR is a shock absorber according to an embodiment of the present invention. The other shock absorber is a shock absorber AL on the extension side for generating and adjusting an extension side damping force. In FIG. 1, the right side in the figure is the shock absorber AR on the compression side and the left side is the shock absorber AL on the extension side, but these arrangements may be reversed.

The shock absorber AR on the compression side, which is a shock absorber according to an embodiment of the present invention, will first be described in detail.

Figure 2:
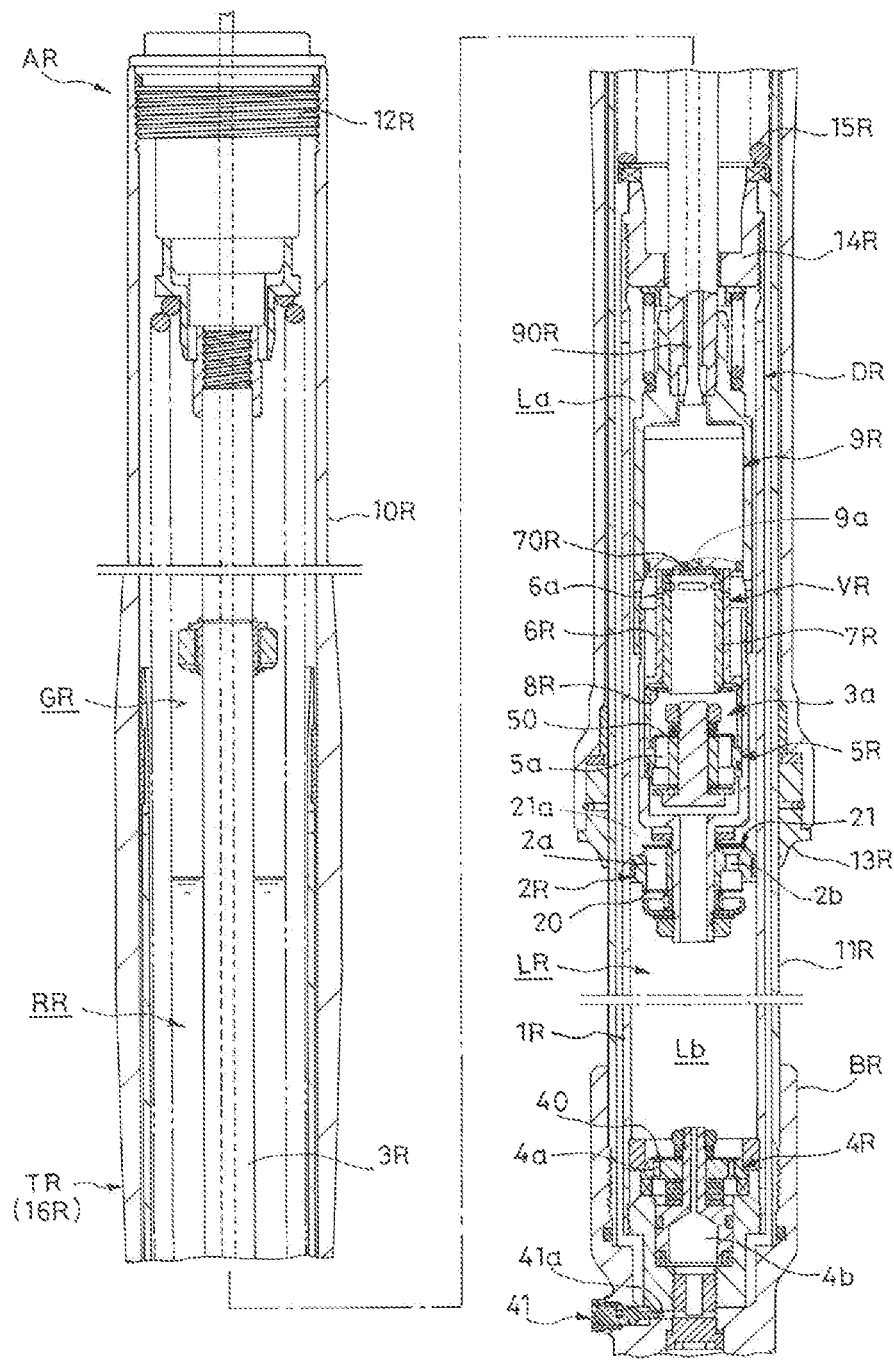
FIG. 2 is a longitudinal sectional view of the shock absorber on the compression side, which is a shock absorber according to an embodiment of the present invention.

As illustrated in FIG. 2, the shock absorber AR on the compression side includes a telescopic tube member TR having an outer tube 10R and an inner tube 11R slidably inserted into the outer tube 10R. In the present embodiment, the tube member TR is of an inverted type, and the outer tube 10R serves as a vehicle body-side tube to which the vehicle body-side brackets CU and CL are connected and the inner tube 11R serves as an axle-side tube to which the axle-side bracket BR is connected.

When the front wheel W vibrates up and down as, for example, the saddle riding type vehicle travels on an uneven road surface, the inner tube 11R moves in and out of the outer tube 10R, and the tube member TR extends and contracts. As described above, the extension and contraction of the tube member TR is also referred to as the extension and contraction of the shock absorber AR. Note that the tube member TR may be of an upright type, and the outer tube 10R may be an axle-side tube and the inner tube 11R may be a vehicle body-side tube.

The upper end of the outer tube 10R serving as the upper end of the tube member TR is then closed by the cap 12R. On the other hand, the lower end of the inner tube 11R serving as the lower end of the tube member TR is closed by the axle-side bracket BR. Further, a cylindrical gap formed in an overlapped portion between the outer tube 10R and the inner tube 11R is closed by an annular seal member 13R attached to the lower end of the outer tube 10R and slidably contacting to the outer periphery of the inner tube 11R.

The inside of the tube member TR is thus a closed space, and a shock absorber main body DR is housed in the tube member TR. The shock absorber main body DR has a cylinder 1R provided in the inner tube 11R, a piston 2R slidably inserted into the cylinder 1R, and a piston rod 3R having a lower end connected to the piston 2R and an upper end projecting outside the cylinder 1R and connected to the cap 12R.

Since the cap 12R is connected to the outer tube 10R, it can be said that the piston rod 3R is connected to the outer tube 10R. Further, the cylinder 1R is connected to the inner tube 11R. The shock absorber main body DR is thus interposed between the outer tube 10R and the inner tube 11R.

An annular head member 14R is mounted on the upper end of the cylinder 1R, and the piston rod 3R axially movably penetrates the inside of the head member 14R. The head member 14R slidably supports the piston rod 3R. A suspension spring 15R formed of a coil spring is interposed between the head member 14R and the cap 12R.

When the shock absorber AR on the compression side extends and contracts and the inner tube 11R moves in and out of the outer tube 10R, the piston rod 3R moves in and out of the cylinder 1R, and the piston 2R moves up and down (in the axial direction) in the cylinder 1R. When the shock absorber AR on the compression side contracts and the piston rod 3R enters into the cylinder 1R, the suspension spring 15R is compressed to exert an elastic force to bias the shock absorber AR on the compression side in the extension direction. Thus, the suspension spring 15R exerts an elastic force corresponding to the compression amount to elastically support the vehicle body.

Note that the shock absorber AR on the compression side of the present embodiment is of a single rod type, and the piston rod 3R extends from one side of the piston 2R to the outside of the cylinder 1R. However, the shock absorber AR on the compression side may be of a double rod type, and the piston rod may extend from both sides of the piston to the outside of the cylinder. Further, the piston rod 3R may project downward from the cylinder 1R and be connected to the axle side, and the cylinder 1R may be connected to the vehicle body side. The suspension spring 15R may also be a spring other than a coil spring such as an air spring.

The cylinder 1R then has a liquid chamber LR filled with a liquid such as a hydraulic fluid formed therein, and the liquid chamber LR is partitioned into an extension side chamber La and a compression side chamber Lb by the piston 2R. The extension side chamber here refers to the one that is compressed by the piston when the shock absorber is extended, out of two chambers partitioned by the piston. On the other hand, the compression side chamber refers to the one that is compressed by the piston when the shock absorber is contracted, out of two chambers partitioned by the piston.

Further, the outside of the cylinder 1R, more specifically, the space between the shock absorber main body DR and the tube member TR is defined as a liquid storage chamber RR. The liquid storage chamber RR stores the same liquid as the liquid in the cylinder 1R, and has a gas chamber GR, in which a gas such as air is sealed, formed on the upper side of the liquid level. Thus, the tube member TR functions as an outer shell of a tank 16R for storing the liquid separately from the liquid in the cylinder 1R.

The liquid storage chamber RR in the tank 16R is communicated with the extension side chamber La, in which the pressure in the extension side chamber La is always substantially the same pressure (tank pressure) as the pressure in the tank 16R (liquid storage chamber RR). Further, the liquid storage chamber RR is partitioned from the compression side chamber Lb by a valve case 4R fixed to the lower end of the cylinder 1R. The valve case 4R is formed with a suction passage 4a for communicating the compression side chamber Lb and the liquid storage chamber RR, and is mounted with a suction valve 40 for opening and closing the suction passage 4a.

The suction valve 40 is an extension side check valve that opens the suction passage 4a upon extension of the shock absorber AR on the compression side, and permits the flow of liquid passing through the suction passage 4a from the liquid storage chamber RR to the compression side chamber Lb, but maintains the suction passage 4a in a closed state upon contraction of the shock absorber AR on the compression side. Note that the suction valve 40 of the present embodiment is a leaf valve, but may be a poppet valve, for example.

Further, the piston 2R is formed with an extension side passage 2a and a compression side passage 2b for communicating the extension side chamber La and the compression side chamber Lb, and is mounted with an extension side check valve 20 for opening and closing the extension side passage 2a, and a hard-side damping element 21 for applying resistance to the flow of liquid passing through the compression side passage 2b from the compression side chamber Lb to the extension side chamber La. The hard-side damping element 21 has a leaf valve 21a stacked on the upper side of the piston 2R and an orifice 21b (FIG. 4) provided in parallel with the leaf valve 21a.

The leaf valve 21a is a thin annular plate formed of, for example, a metal, or a laminated body formed by stacking the annular plates, has elasticity, and is mounted on the piston 2R in a state in which deflection on its outer peripheral side is allowed. The pressure in the compression side chamber Lb acts in a direction to deflect the outer peripheral portion of the leaf valve 21a upward. The orifice 21b is formed by a notch provided in the outer peripheral portion of the leaf valve 21a that is separated from and seated on the valve seat of the piston 2R, or by a stamping provided in the above valve seat, for example.

The compression side chamber Lb is compressed by the piston 2R when the shock absorber AR on the compression side is contracted, causing its internal pressure to rise and become higher than the pressure in the extension side chamber La. When the piston speed is in the low speed range upon contraction of the shock absorber AR on the compression side, and the differential pressure between the compression side chamber Lb and the extension side chamber La is less than the valve opening pressure of the leaf valve 21a, the liquid flows from the compression side chamber Lb to the extension side chamber La through the orifice 21b, and resistance is applied to the flow of the liquid. Further, when the piston speed is increased to be in the middle and high speed range upon contraction of the shock absorber AR on the compression side, and the above differential pressure is increased to be higher than or equal to the valve opening pressure of the leaf valve 21a, the outer peripheral portion of the leaf valve 21a deflects, the liquid flows from the compression side chamber Lb to the extension side chamber La through a gap formed between the outer peripheral portion and the piston 2R, and resistance is applied to the flow of the liquid.

As described above, the hard-side damping element 21, which has the orifice 21b and the leaf valve 21a arranged in parallel with the orifice 21b, is a first compression side damping element that applies resistance to the flow of liquid from the compression side chamber Lb to the extension side chamber La upon contraction of the shock absorber AR on the compression side. The resistance of the hard-side damping element 21 on the compression side is caused by the orifice 21b when the piston speed is in the low speed range, and is caused by the leaf valve 21a when the piston speed is in the middle and high speed range.

On the other hand, the extension side check valve 20 opens the extension side passage 2a upon extension of the shock absorber AR on the compression side, and permits the flow of liquid passing through the extension side passage 2a from the extension side chamber La to the compression side chamber Lb, but maintains the extension side passage 2a in a closed state upon contraction of the shock absorber AR on the compression side. Note that the extension side check valve 20 of the present embodiment is a leaf valve, but may be a poppet valve, for example. Further, if there is no shortage of liquid suction in the cylinder 1R, the extension side passage 2a and the extension side check valve 20 may be omitted.

The piston rod 3R is then provided with a damping force adjusting unit for changing the flow rate of the liquid passing through the hard-side damping element 21. The damping force adjusting unit has a solenoid valve VR capable of changing the opening area of a compression side bypass passage 3a for communicating the extension side chamber La and the compression side chamber Lb by bypassing the hard-side damping element 21, and a soft-side damping element 50 provided partway in the compression side bypass passage 3a in series with the solenoid valve VR.

Figure 3:
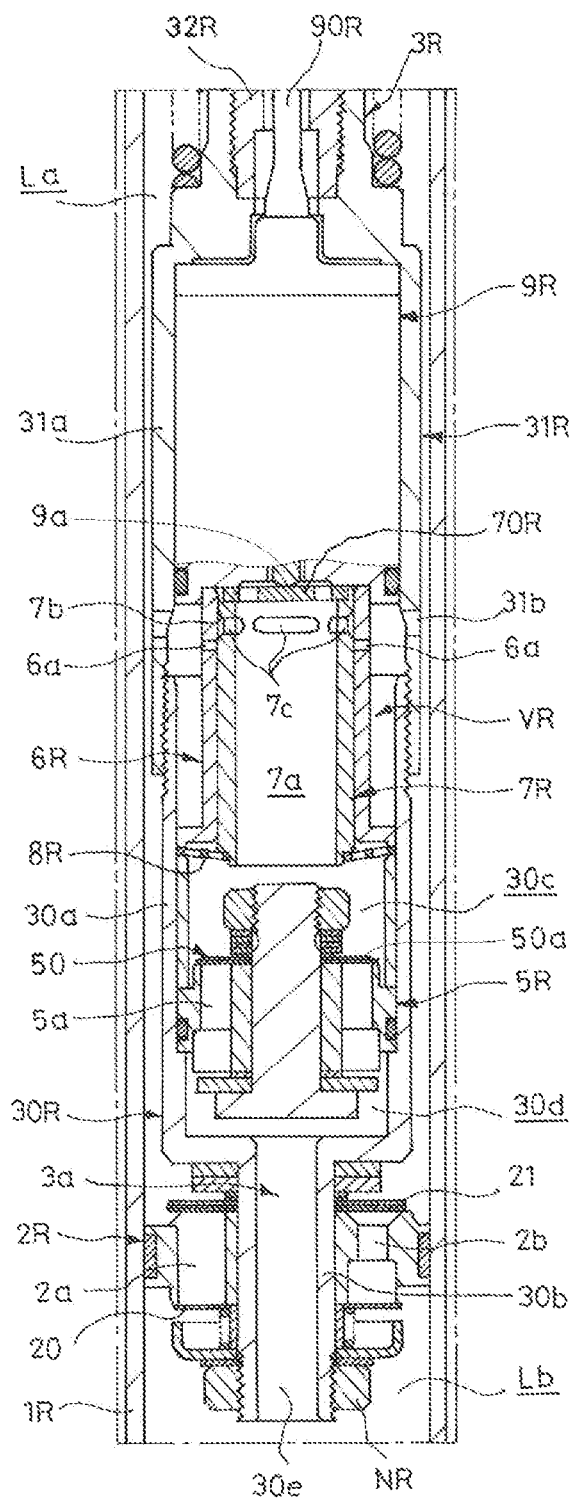
FIG. 3 is a longitudinal sectional view illustrating a part of FIG. 2 in an enlarged manner.

More specifically, as illustrated in FIG. 3, the piston rod 3R has a piston holding member 30R positioned at its tip end, a solenoid case member 31R connected to its tail end side, and a cylindrical rod body 32R connected to its tail end side and extending outside the cylinder 1R. The piston holding member 30R includes a bottomed cylindrical housing portion 30a and a shaft portion 30b projecting downward from the bottom portion of the housing portion 30a, and the outer periphery of the shaft portion 30b is fixed with an annular piston 2R by a nut NR.

The inner periphery of the cylindrical portion of the housing portion 30a is fixed with a valve case 5R for partitioning the inner side of the housing portion into an upper chamber 30c and a lower chamber 30d. The valve case 5R is formed with a passage 5a for communicating the upper chamber 30c and the lower chamber 30d, and the passage 5a is provided with the soft-side damping element 50. Further, the shaft portion 30b of the piston holding member 30R is formed with a longitudinal hole 30e opened downward and communicated into the housing portion 30a, and the lower chamber 30d communicates with the compression side chamber Lb through the longitudinal hole 30e.

The solenoid case member 31R then includes a cylindrical portion 31a screwed to the upper end outer periphery of the housing portion 30a. The cylindrical portion 31a is formed with a lateral hole 31b opened sideward, and the extension side chamber La communicates with the inside of the solenoid case member 31R through the lateral hole 31b. The solenoid valve VR is provided partway in a passage connecting the lateral hole 31b and the upper chamber 30c.

In the present embodiment, a compression side bypass passage 3a is formed which has the lateral hole 31b, the upper chamber 30c, the lower chamber 30d, and the longitudinal hole 30e formed in the solenoid case member 31R or the piston holding member 30R and bypasses the hard-side damping element 21. The solenoid valve VR and the soft-side damping element 50 are provided partway in the compression side bypass passage 3a in series.

The outer diameters of the solenoid case member 31R and the piston holding member 30R for housing the solenoid valve VR and the soft-side damping element 50 are designed to be smaller than the inner diameter of the cylinder 1R so as not to partition the extension side chamber La. The soft-side damping element 50 has a leaf valve 50a stacked on the upper side of the valve case 5R, and an orifice 50b (FIG. 4) provided in parallel with the leaf valve 50a.

The leaf valve 50a is a thin annular plate formed of, for example, a metal, or a laminated body formed by stacking the annular plates, has elasticity, and is mounted on the valve case 5R in a state in which deflection on its outer peripheral side is allowed. The pressure in the lower chamber 30d acts in a direction to deflect the outer peripheral portion of the leaf valve 50a upward. The orifice 50b is formed by a notch provided in the outer peripheral portion of the leaf valve 50a that is separated from and seated on the valve seat of the valve case 5R, or by a stamping provided in the above valve seat, for example.

The pressure in the lower chamber 30d becomes higher than the pressure in the upper chamber 30c when the shock absorber AR on the compression side is contracted and when the solenoid valve VR opens the compression side bypass passage 3a. When the piston speed is in the low speed range upon contraction of the shock absorber AR on the compression side, and the differential pressure between the upper chamber 30c and the lower chamber 30d is less than the valve opening pressure of the leaf valve 50a, the liquid flows through the orifice 50b from the lower chamber 30d to the upper chamber 30c, that is, from the compression side chamber Lb to the extension side chamber La, and resistance is applied to the flow of the liquid. Further, when the piston speed is increased to be in the middle and high speed range upon contraction of the shock absorber AR on the compression side, and the above differential pressure is increased to be higher than or equal to the valve opening pressure of the leaf valve 50a, the outer peripheral portion of the leaf valve 50a deflects, and the liquid flows from the lower chamber 30d to the upper chamber 30c, that is, from the compression side chamber Lb to the extension side chamber La through a gap formed between the outer peripheral portion and the valve case 5R, and resistance is applied to the flow of the liquid.

As described above, the soft-side damping element 50, which has the orifice 50b and the leaf valve 50a arranged in parallel with the orifice 50b, is a second compression side damping element that applies resistance to the flow of liquid passing through the compression side bypass passage 3a from the compression side chamber Lb to the extension side chamber La upon contraction of the shock absorber AR on the compression side. The resistance of the soft-side damping element 50 on the compression side is caused by the orifice 50b when the piston speed is in the low speed range, and is caused by the leaf valve 50a when the piston speed is in the middle and high speed range.

Further, the leaf valve 50a of the soft-side damping element 50 is a valve having a low valve rigidity (easy to deflect) as compared with the leaf valve 21a of the hard-side damping element 21, and when the flow rate is the same, resistance (pressure loss) applied to the flow of liquid is small. In other words, the liquid is more likely to pass through the leaf valve 50a than through the leaf valve 21a under the same conditions. The orifice 50b of the soft-side damping element 50 is a large-diameter orifice having an opening area larger than that of the orifice 21b of the hard-side damping element 21, and when the flow rate is the same, resistance (pressure loss) applied to the flow of liquid is small.

The solenoid valve VR then has a cylindrical holder 6R fixed in the piston rod 3R, a spool 7R reciprocatably inserted in the holder 6R, a biasing spring 8R biasing the spool 7R in one of the moving directions, and a solenoid 9R applying thrust in a direction opposite to the biasing force of the biasing spring 8R to the spool 7R. The magnitude of the opening degree of the solenoid valve VR is adjusted by changing the position of the spool 7R in the holder 6R.

More specifically, the holder 6R is disposed along the central axis of the piston rod 3R, above the valve case 5R in the piston rod 3R, with one axial end facing upward (solenoid case member 31R side) and the other axial end facing downward (valve case 5R side). Further, the holder 6R is formed with one or more ports 6a penetrating in the radial direction. The port 6a communicates with the extension side chamber La via the lateral hole 31b of the solenoid case member 31R, and is opened and closed by the spool 7R.

The spool 7R is cylindrical and slidably inserted into the holder 6R. A plate 70R is laminated on the upper end of the spool 7R, and a plunger 9a, which will be described below, of the solenoid 9R abuts onto the plate 70R. On the other hand, the biasing spring 8R abuts onto the lower end of the spool 7R, and biases the spool 7R in a direction of pushing the spool up.

A center hole 7a formed at the center of the spool 7R opens downward and communicates with the upper chamber 30c. Further, the spool 7R is formed with an annular groove 7b along the circumferential direction of its outer periphery, and one or more side holes 7c for communicating the inner side of the annular groove 7b and the center hole 7a. Thus, the inner side of the annular groove 7b communicates with the upper chamber 30c via the side hole 7c and the center hole 7a.

The above configuration allows communication between the extension side chamber La and the upper chamber 30c when the spool 7R is positioned at a position where the annular groove 7b faces the port 6a of the holder 6R. The state in which the annular groove 7b and the port 6a face each other means the state in which the annular groove 7b and the port 6a overlap each other in the radial direction, and the opening area of the compression side bypass passage 3a varies according to the overlap amount.

For example, when the overlap amount of the annular groove 7b and the port 6a increases and the opening degree of the solenoid valve VR increases, the opening area of the compression side bypass passage 3a is increased. On the other hand, when the overlap amount of the annular groove 7b and the port 6a decreases and the opening degree of the solenoid valve VR decreases, the opening area of the compression side bypass passage 3a is decreased. Further, when the spool 7R moves to a position where the annular groove 7b and the port 6a do not completely overlap and the solenoid valve VR is closed, the communication of the compression side bypass passage 3a is cut off.

Although not illustrated in detail, the solenoid 9R of the solenoid valve VR has a cylindrical stator housed in the solenoid case member 31R and including a coil, a cylindrical movable iron core movably inserted into the stator, and a plunger 9a mounted on the inner periphery of the movable iron core and having a tip end abutting onto the plate 70R. A harness 90R for supplying power to the solenoid 9R projects outward through the inside of the rod body 32R and is connected to a power source.

When the solenoid 9R is energized through the harness 90R, the movable iron core is pulled downward, and the plunger 9a moves downward, pushing the spool 7R down against the biasing force of the biasing spring 8R. The annular groove 7b and the port 6a then face each other to open the solenoid valve VR. The relationship between the opening degree of the solenoid valve VR and the energization amount to the solenoid 9R is proportional to a positive proportional constant, and the opening degree increases as the energization amount increases. Further, when the solenoid 9R is de-energized, the solenoid valve VR is closed.

As described above, the solenoid valve VR of the present embodiment is of the normally closed type that biases the spool 7R serving as its valve element in the closing direction by the biasing spring 8R and applies thrust in the opening direction by the solenoid 9R to the spool 7R. The opening degree increases in proportion to the energization amount of the solenoid valve VR, and the opening area of the compression side bypass passage 3a increases as the opening degree increases. Therefore, it can be said that the opening area of the compression side bypass passage 3a increases in proportion to the energization amount to the solenoid valve VR.

In addition to a damping force adjusting unit for automatically adjusting the flow rate of the hard-side damping element 21 on the compression side, including the above solenoid valve VR, the shock absorber AR on the compression side of the present embodiment then includes a second damping force adjusting unit for manually adjusting the flow rate of the hard-side damping element 21. As illustrated in FIG. 2, the second damping force adjusting unit is provided at the bottom portion of the shock absorber AR on the compression side, and has a manual valve 41 capable of changing the opening area of a discharge passage 4b for communicating the compression side chamber Lb and the liquid storage chamber RR by manual operation.

The manual valve 41 includes a needle-shaped valve element 41a that is separated from and seated on an annular valve seat (not illustrated) provided partway in the discharge passage 4b. When the manual valve 41 is rotated, the valve element 41a is moved close to or away from the valve seat in accordance with the rotating direction, and the size of the opening area of the discharge passage 4b is adjusted. In the present embodiment, when the solenoid valve VR is normally energized, the valve element 41a is seated on the valve seat and the communication of the discharge passage 4b is cut off by the manual valve 41.

Figure 4:
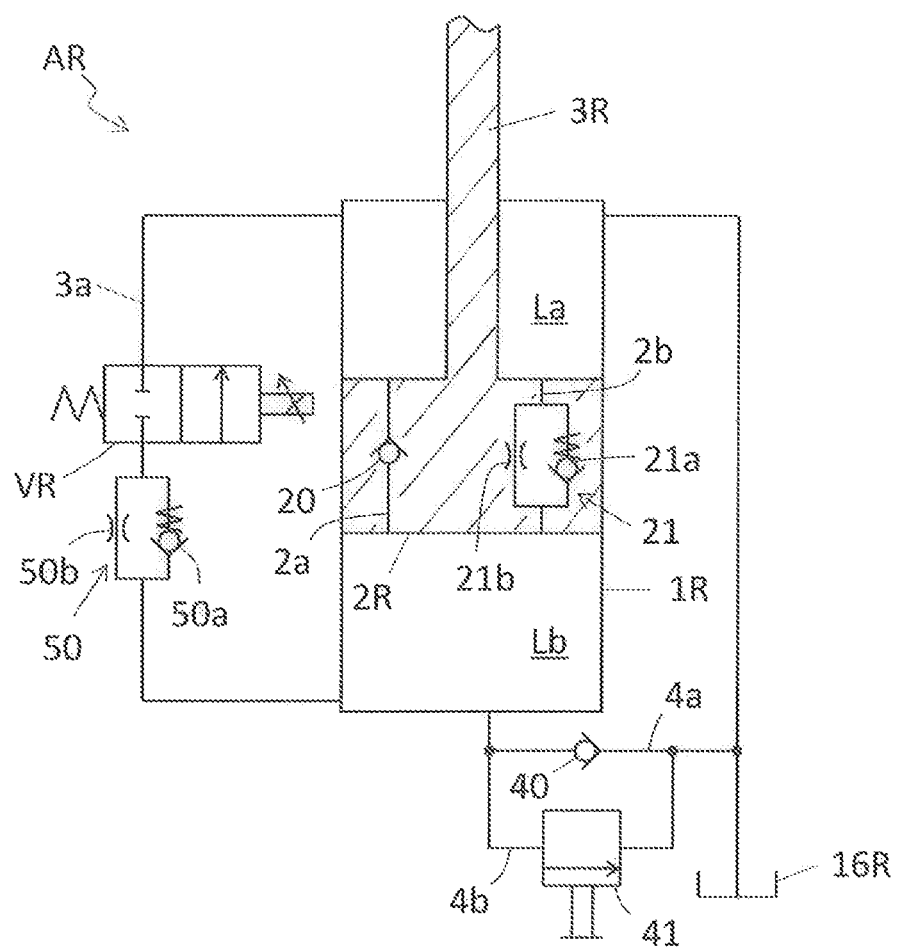
FIG. 4 is a hydraulic circuit diagram of the shock absorber on the compression side, which is a shock absorber according to an embodiment of the present invention.

In summary, as illustrated in FIG. 4, the shock absorber AR on the compression side includes the cylinder 1R, the piston 2R slidably inserted into the cylinder 1R and partitioning the inside of the cylinder 1R into the extension side chamber La and the compression side chamber Lb, the piston rod 3R having a tip end connected to the piston 2R and a tail end projecting outside the cylinder 1R, and the tank 16R connected to the extension side chamber La in the cylinder 1R, and the pressure in the extension side chamber La is the tank pressure.

Further, the shock absorber AR on the compression side is provided with the extension side passage 2a, the compression side passage 2b, and the compression side bypass passage 3a as the passages for communicating the extension side chamber La and the compression side chamber Lb. The extension side passage 2a is provided with an extension side check valve 20 for permitting only the unidirectional flow of the liquid flowing from the extension side chamber La to the compression side chamber Lb, and the liquid flowing from the compression side chamber Lb to the extension side chamber La passes through the compression side passage 2b or the compression side bypass passage 3a.

The compression side passage 2b has the orifice 21b and the leaf valve 21a arranged in parallel with the orifice, and is provided with the hard-side damping element 21 on the compression side for applying resistance to the flow of liquid. On the other hand, the compression side bypass passage 3a has the orifice 50b having an opening area larger than that of the orifice 21b, and the leaf valve 50a arranged in parallel with the orifice and having a valve rigidity lower than that of the leaf valve 21a, and is provided with the soft-side damping element 50 on the compression side for reducing resistance applied to the flow of liquid.

Further, the compression side bypass passage 3a is provided with the solenoid valve VR in series with the soft-side damping element 50 on the compression side, so that the opening area of the compression side bypass passage 3a can be changed by adjusting the energization amount to the solenoid valve VR. The solenoid valve VR is of the normally closed type and is set so as to increase the opening area of the compression side bypass passage 3a in proportion to the energization amount.

The shock absorber AR on the compression side is provided with the suction passage 4a and the discharge passage 4b as the passages for communicating the compression side chamber Lb and the tank 16R. The suction passage 4a is provided with the suction valve 40 for permitting only the unidirectional flow of liquid from the tank 16R to the compression side chamber Lb. On the other hand, the discharge passage 4b is provided with the manual valve 41 of the normally closed type which is opened and closed by manual operation.

The shock absorber AL on the extension side, which is paired with the shock absorber AR on the compression side which is a shock absorber according to an embodiment of the present invention, will then be described. In the present embodiment, since the basic configurations of the shock absorbers AR and AL are common, a description of a specific structure of the shock absorber AL on the extension side will be omitted.

Figure 5:
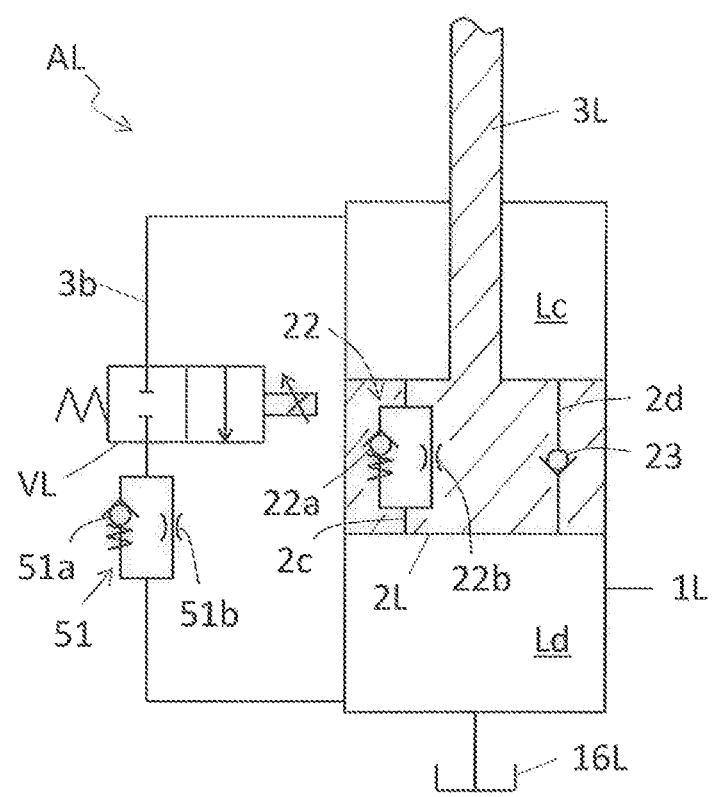
FIG. 5 is a hydraulic circuit diagram of a shock absorber on the extension side paired with the shock absorber on the compression side which is a shock absorber according to an embodiment of the present invention.

As illustrated in FIG. 5, the shock absorber AL on the extension side includes a cylinder 1L, a piston 2L slidably inserted into the cylinder 1L and partitioning the inside of the cylinder 1L into an extension side chamber Lc and a compression side chamber Ld, a piston rod 3L having a tip end connected to the piston 2L and a tail end projecting outside the cylinder 1L, and a tank 16L connected to the compression side chamber Ld in the cylinder 1L, and the pressure in the compression side chamber Ld is the tank pressure.

Further, the shock absorber AL on the extension side is provided with an extension side passage 2c, a compression side passage 2d, and an extension side bypass passage 3b as the passages for communicating the extension side chamber Lc and the compression side chamber Ld. The compression side passage 2d is provided with a compression side check valve 23 for permitting only the unidirectional flow of the liquid flowing from the compression side chamber Ld to the extension side chamber Lc, and the liquid flowing from the extension side chamber Lc to the compression side chamber Ld passes through the extension side passage 2c or the extension side bypass passage 3b.

The extension side passage 2c has an orifice 22b and a leaf valve 22a arranged in parallel with the orifice, and is provided with a hard-side damping element 22 on the extension side for applying resistance to the flow of liquid. On the other hand, the extension side bypass passage 3b has an orifice 51b having a diameter larger than that of the orifice 22b, and a leaf valve 51a arranged in parallel with the orifice and having a valve rigidity lower than that of the leaf valve 22a, and is provided with a soft-side damping element 51 on the extension side for reducing resistance applied to the flow of liquid.

Further, the extension side bypass passage 3b is provided with a solenoid valve VL in series with the soft-side damping element 51, so that the opening area of the extension side bypass passage 3b can be changed by adjusting the energization amount to the solenoid valve VL. As with the solenoid valve VR of the shock absorber AR on the compression side, the solenoid valve VL is of the normally closed type and is set so as to increase the opening area of the extension side bypass passage 3b in proportion to the energization amount.

The operation of the front fork F including the shock absorber AR on the compression side, which is a shock absorber according to an embodiment of the present invention, and the shock absorber AL on the extension side, which is paired with the shock absorber AR on the compression side, will be described below.

When the shock absorbers AR and AL are contracted, the piston rods 3R and 3L enter into the cylinders 1R and 1L, and the pistons 2R and 2L compress the compression side chambers Lb and Ld. In a normal state, a manual valve 41 closes the discharge passage 4b. Therefore, when the shock absorber AR on the compression side is contracted, the liquid in the compression side chamber Lb moves to the extension side chamber La through the compression side passage 2b or the compression side bypass passage 3a. Resistance is applied to the flow of the liquid by the hard-side damping element 21 or the soft-side damping element 50 on the compression side, and a compression side damping force caused by the resistance is generated.

On the other hand, when the shock absorber AL on the extension side is contracted, the compression side check valve 23 is opened, and the liquid in the compression side chamber Ld moves to the extension side chamber Lc through the compression side passage 2d. At this point, the liquid can pass through the compression side check valve 23 with relatively no resistance. Further, the compression side chamber Ld communicates with the tank 16L and is maintained at the tank pressure. Therefore, the compression side damping force of the entire front fork F is mainly caused by the compression side damping force generated by the shock absorber AR on the compression side.

When the shock absorber AR on the compression side is contracted in a normal state, the distribution ratio of the liquid passing through the hard-side damping element 21 on the compression side and the soft-side damping element 50 on the compression side varies according to the opening area of the compression side bypass passage 3a, whereby the damping coefficient increases and decreases, and the magnitude of the compression side damping force generated is adjusted.

Specifically, as described above, the hard-side damping element 21 and the soft-side damping element 50 on the compression side each have the orifices 21b and 50b and the leaf valves 21a and 50a arranged in parallel with the orifices. Therefore, the damping force characteristic on the compression side is an orifice characteristic proportional to the square of the piston speed specific to the orifice when the piston speed is in the low speed range, and is a valve characteristic proportional to the piston speed specific to the leaf valve when the piston speed is in the middle and high speed range.

When the energization amount to the solenoid valve VR is increased to increase the opening degree, the flow rate of the compression side bypass passage 3a increases, thereby decreasing the ratio of the liquid passing through the hard-side damping element 21 on the compression side and increasing the ratio of the liquid passing through the soft-side damping element 50 on the compression side. Since the orifice 50b of the soft-side damping element 50 is a large-diameter orifice having an opening area larger than that of the orifice 21b of the hard-side damping element 21, when the ratio of liquid toward the soft-side damping element 50 side increases, the damping coefficient decreases in both the low speed range and the middle and high speed range, and the compression side damping force generated with respect to the piston speed decreases. When the amount of current supplied to the solenoid valve VR is maximized, the damping coefficient is minimized, and the compression side damping force generated with respect to the piston speed is minimized.

On the contrary, when the energization amount to the solenoid valve VR is decreased to decrease the opening degree, the flow rate of the compression side bypass passage 3a decreases, thereby increasing the ratio of the liquid passing through the hard-side damping element 21 on the compression side and decreasing the ratio of the liquid passing through the soft-side damping element 50 on the compression side. The damping coefficient is then increased in both the low speed range and the middle and high speed range, and the compression side damping force with respect to the piston speed is increased. When the solenoid valve VR is closed by cutting off the energization to the solenoid valve VR, the communication of the compression side bypass passage 3a is cut off, so that the whole liquid passes through the hard-side damping element 21 on the compression side. The damping coefficient is then maximized, and the compression side damping force generated with respect to the piston speed is maximized.

Figure 6:
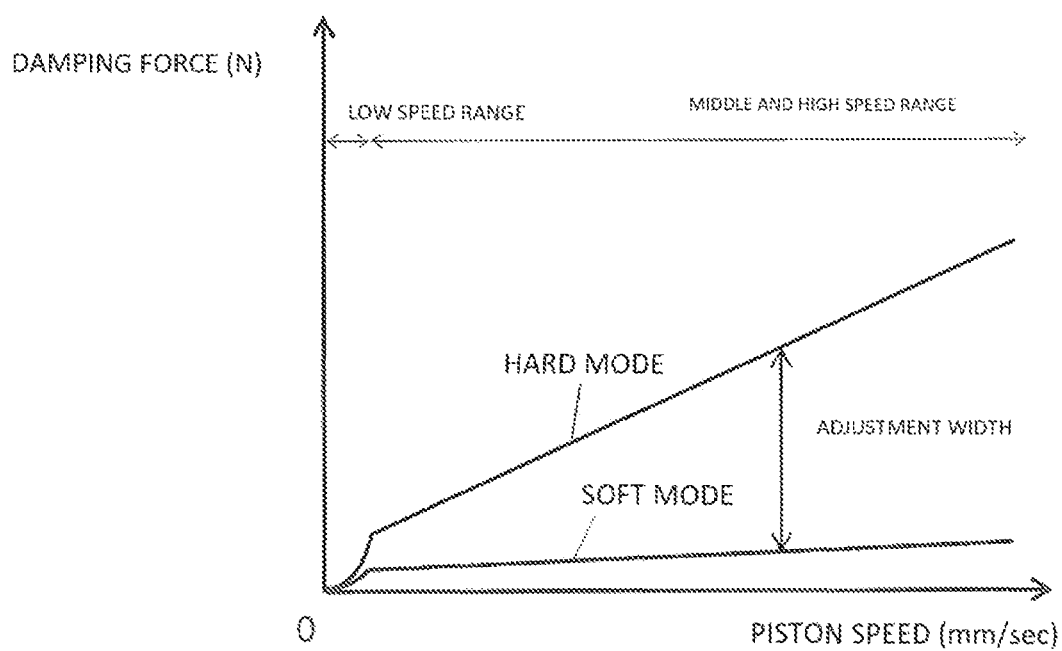
FIG. 6 is a damping force characteristic diagram illustrating the characteristics of the compression side damping force with respect to the piston speed of the shock absorber on the compression side, which is a shock absorber according to an embodiment of the present invention.
Figure 7:
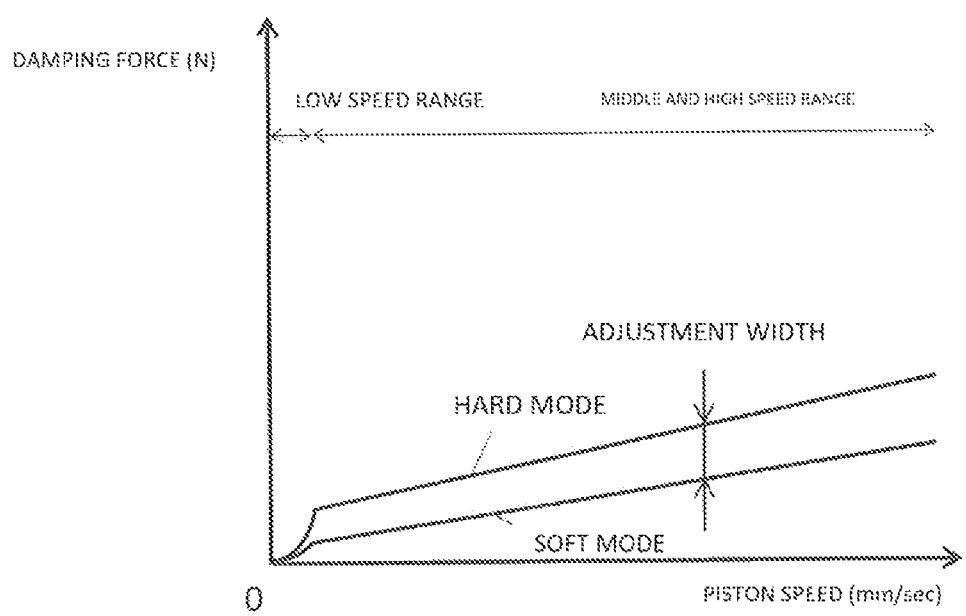
FIG. 7 is a damping force characteristic diagram illustrating the characteristics of the damping force with respect to the piston speed of a shock absorber having a traditional needle valve.
Figure 8:
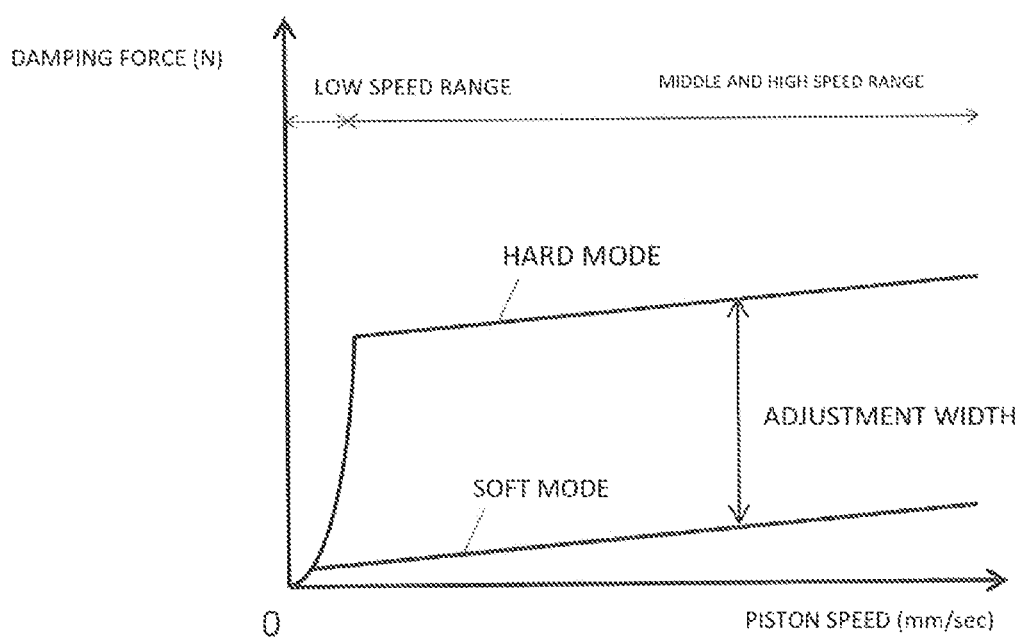
FIG. 8 is a damping force characteristic diagram illustrating the characteristics of the damping force with respect to the piston speed of a shock absorber having a traditional pilot valve.

As described above, when the distribution ratio of the liquid passing through the hard-side damping element 21 and the soft-side damping element 50, which are the first and second damping elements on the compression side, is changed by the solenoid valve VR, the damping coefficient is increased and decreased, and as illustrated in FIG. 6, the inclination of the characteristic line illustrating the damping force characteristic on the compression side is changed. The compression side damping force is then adjusted between a hard mode in which the damping force generated by maximizing the inclination of the characteristic line is increased and a soft mode in which the damping force generated by minimizing the inclination is decreased.

In the soft mode, the inclination of the characteristic line illustrating the damping force characteristic decreases in both the low speed range and the middle and high speed range, and in the hard mode, the inclination of the characteristic line illustrating the damping force characteristic increases in both the low speed range and the middle and high speed range. Therefore, the change in the damping force characteristic when the damping force characteristic is shifted from the orifice characteristic to the valve characteristic is gradual in any mode.

Further, the soft-side damping element 50 has the leaf valve 50a, which has a low valve rigidity, arranged in parallel with the orifice 50b. Therefore, even if a valve having a high valve rigidity and a high valve opening pressure is employed as the leaf valve 21a of the hard-side damping element 21, and the adjustment width in the direction of increasing the compression side damping force is increased, the damping force is not excessive in the soft mode.

At the time of failure (abnormal state), the energization to the solenoid valve VR is cut off to switch the mode to the hard mode. At this point, when the manual valve 41 is opened, the liquid in the compression side chamber Lb passes through not only the compression side passage 2b but also the discharge passage 4b, so that the flow rate of the liquid passing through the hard-side damping element 21 on the compression side is reduced and the compression side damping force generated is reduced.

The liquid corresponding to the volume of the piston rod 3R entering into the cylinder 1R upon contraction of the shock absorber AR on the compression side is discharged from the extension side chamber La to the tank 16R. On the other hand, the liquid corresponding to the volume of the piston rod 3L entering into the cylinder 1L upon contraction of the shock absorber AL on the extension side is discharged from the compression side chamber Ld to the tank 16L.

On the other hand, when the shock absorbers AR and AL are extended, the piston rods 3R and 3L are come out of the cylinders 1R and 1L, and the pistons 2R and 2L compress the extension side chambers La and Lc. At this point, in the shock absorber AL on the extension side, the liquid in the extension side chamber Lc moves to the compression side chamber Ld through the extension side passage 2c or the extension side bypass passage 3b. Resistance is applied to the flow of the liquid by the hard-side damping element 22 on the extension side or the soft-side damping element 51 on the extension side, and an extension side damping force caused by the resistance is generated.

On the other hand, when the shock absorber AR on the compression side is extended, the extension side check valve 20 is opened, and the liquid in the extension side chamber La moves to the compression side chamber Lb through the extension side passage 2a. At this point, the liquid can pass through the extension side check valve 20 with relatively no resistance. Further, the extension side chamber La is communicated with the tank 16R and is maintained at the tank pressure. Therefore, the extension side damping force of the entire front fork F is mainly caused by the extension side damping force generated by the shock absorber AL on the extension side.

When the shock absorber AL on the extension side is extended in a normal state, the distribution ratio of the liquid passing through the hard-side damping element 22 on the extension side and the soft-side damping element 51 on the extension side varies according to the opening area of the extension side bypass passage 3b, whereby the damping coefficient increases and decreases, and the magnitude of the extension side damping force generated is adjusted.

Similar to the hard-side damping element 21 and the soft-side damping element 50 on the compression side, the hard-side damping element 22 and the soft-side damping element 51 on the extension side each have the orifices 22b and 51b and leaf valves 22a and 51a arranged in parallel with the orifices, and the orifice 51b of the soft-side damping element 51 is a large-diameter orifice having an opening area larger than that of the orifice 22b of the hard-side damping element 22.

Therefore, even during extension of the shock absorbers, in the soft mode, the inclination of the characteristic line illustrating the damping force characteristic decreases in both the low speed range and the middle and high speed range, and in the hard mode, the inclination of the characteristic line illustrating the damping force characteristic increases in both the low speed range and the middle and high speed range. Therefore, even during the extension of the shock absorbers, the change in the damping force characteristic when the damping force characteristic is shifted from the orifice characteristic to the valve characteristic can be gradual in any mode.

The liquid corresponding to the volume of the piston rod 3L having come out of the cylinder 1L upon extension of the shock absorber AL on the extension side is supplied from the tank 16L to the compression side chamber Ld. On the other hand, when the shock absorber AR on the compression side is extended, the suction valve 40 is opened, and the liquid corresponding to the volume of the piston rod 3R having come out of the cylinder 1R is supplied from the tank 16R to the compression side chamber Lb.

The working effects of the shock absorber AR on the compression side, which is a shock absorber according to an embodiment of the present invention, and the front fork F including the shock absorber AR on the compression side and the shock absorber AL on the extension side will be described below.

The shock absorber (shock absorber) AR on the compression side according to the present embodiment includes the cylinder 1R; the piston 2R axially movably inserted into the cylinder 1R and partitioning the inside of the cylinder 1R into the extension side chamber La and the compression side chamber Lb; and the piston rod 3R connected to the piston 2R and having one end projecting outside the cylinder 1R.

Further, the above shock absorber AR on the compression side includes the hard-side damping element 21 for applying resistance to the flow of liquid from the compression side chamber Lb to the extension side chamber La, the solenoid valve VR capable of changing the opening area of the compression side bypass passage (bypass passage) 3a for communicating the compression side chamber Lb and the extension side chamber La by bypassing the hard-side damping element 21, and the soft-side damping element 50 provided in the compression side bypass passage 3a in series with the solenoid valve VR. The hard-side damping element 21 has the orifice 21b and the leaf valve 21a provided in parallel with the orifice 21b. On the other hand, the soft-side damping element 50 has an orifice (large-diameter orifice) 50b having an opening area larger than that of the orifice 21b.

According to the above configuration, the characteristic of the damping force generated when the shock absorber AR on the compression side is contracted is an orifice characteristic specific to the orifice when the piston speed is in the low speed range, and a valve characteristic specific to the leaf valve when the piston speed is in the middle and high speed range. When the opening area of the compression side bypass passage 3a is changed by the solenoid valve VR, the distribution ratio of the flow rate passing through each of the hard-side damping element 21 and the soft-side damping element 50 in the liquid moving from the compression side chamber Lb to the extension side chamber La during contraction of the shock absorber AR on the compression side varies. Therefore, both the damping coefficient when the piston speed is in the low speed range and the damping coefficient when the piston speed is in the middle and high speed range can be freely set to increase the adjustment width of the compression side damping force when the piston speed is in the middle and high speed range.

Further, in the soft mode in which the opening area of the compression side bypass passage 3a is increased, both the damping coefficient when the piston speed is in the low speed range and the damping coefficient when the piston speed is in the middle and high speed range are decreased. On the other hand, in the hard mode in which the opening area of the compression side bypass passage 3a is reduced, both the damping coefficient when the piston speed is in the low speed range and the damping coefficient when the piston speed is in the middle and high speed range are increased. Therefore, when the characteristic of the compression side damping force changes from the orifice characteristic in the low speed range to the valve characteristic in the middle and high speed range, the change in the inclination of the characteristic line is gradual in any mode. Thus, when the shock absorber AR according to the present embodiment is mounted on a vehicle, the uncomfortable feeling caused by the above change in inclination can be reduced, and the riding comfort of the vehicle can be improved.

In the shock absorber AR on the compression side of the present embodiment, the soft-side damping element 50 has the above orifice (large-diameter orifice) 50b and the leaf valve 50a provided in parallel with the orifice 50b. As described above, when the soft-side damping element 50 is provided with the leaf valve 50a, the damping force in the soft mode is not excessive even if the leaf valve 21a of the hard-side damping element 21 is a valve having a high valve rigidity and a high valve opening pressure. In other words, the above configuration can employ a valve having a high valve rigidity as the leaf valve 21a of the hard-side damping element 21. Employing such a valve allows the adjustment width of the damping force to be increased in the direction of increasing the compression side damping force, and the adjustment width of the compression side damping force to be further increased when the piston speed is in the middle and high speed range.

In the shock absorber AR on the compression side of the present embodiment, the piston 2R is connected to the other end of the piston rod 3R and of a single rod type. Further, the shock absorber AR on the compression side includes the tank 16R connected to the extension side chamber La, and the suction valve 40 for permitting only the flow of liquid from the tank 16R to the compression side chamber Lb. According to the configuration, the volume of the piston rod 3R moving in and out of the cylinder 1R can be compensated by the tank 16R. Further, the shock absorber AR on the compression side can be a single-sided shock absorber exhibiting damping force only in the compression stroke.

The front fork F includes the shock absorber AL on the extension side which is paired with the above shock absorber AR on the compression side. The shock absorber AL on the extension side is a single-sided shock absorber exhibiting damping force only in the extension stroke, is designed to change the distribution ratio of the flow rate passing through each of the hard-side damping element 22 on the extension side and the soft-side damping element 51 on the extension side in the liquid moving from the extension side chamber Lc to the compression side chamber Ld according to the opening degree of the solenoid valve VL, and to adjust the magnitude of the extension side damping force generated. Further, the hard-side damping element 22 on the extension side and the soft-side damping element 51 on the extension side each have the orifices 22b and 51b and the leaf valves 22a and 51a arranged in parallel with the orifices 22b and 51b.

Therefore, the above front fork F can increase the adjustment width of the damping force on both extension and compression sides when the piston speed is in the middle and high speed range. Further, when the damping force characteristic of the front fork F changes from the orifice characteristic in the low speed range to the valve characteristic in the middle and high speed range, the change in the inclination of the characteristic line can be gradual on both extension and compression sides in any mode. Therefore, when the above front fork F is mounted on a vehicle, the uncomfortable feeling caused by the above change in the inclination can be further reduced, and the riding comfort of the vehicle can be further improved.

The solenoid valves VR and VL of the shock absorbers AR and AL of the present embodiment are set so as to change the opening degree in proportion to the energization amount. The configuration can change the opening areas of the compression side bypass passage 3a and the extension side bypass passage 3b without steps.

The shock absorber AR on the compression side of the present embodiment includes the manual valve 41 capable of changing the opening area of the discharge passage 4b for communicating the compression side chamber Lb and the tank 16R by manual operation. According to the configuration, even if the solenoid valve VR is closed at the time of failure, the compression side damping force generated is reduced when the manual valve 41 is manually opened. Therefore, the compression side damping force in the failure mode can be prevented from being excessive, and the riding comfort of the vehicle can be improved.

In the shock absorber AR on the compression side of the present embodiment, the solenoid valve VR has the cylindrical holder 6R in which the port 6a to be connected to the compression side bypass passage 3a is formed, the cylindrical spool 7R reciprocatably inserted into the holder 6R and capable of opening and closing the port 6a, the biasing spring 8R for biasing the spool 7R in one of moving directions of the spool 7R, and the solenoid 9R for applying thrust in a direction opposite to a biasing force of the biasing spring 8R to the spool 7R.

In the case where a needle valve capable of reciprocating as a valve element is provided as a solenoid valve described in JP 2010-7758 A, for example, and the opening degree is changed by increasing and decreasing the size of a gap formed between the pointed end of the needle valve and a valve seat, increasing the stroke amount of the valve element may be necessary in order to increase the adjustment width of the opening degree, but may not be possible.

Specifically, increasing the stroke amount of the needle valve causes the movable space of the needle valve to be increased and securing the housing space to be difficult. Increasing the stroke amount of the plunger of the solenoid in order to increase the stroke amount of the needle valve requires a design change of the solenoid and makes the design complicated. Further, increasing the stroke amount of the needle valve without changing the design of the solenoid requires components for increasing the movement amount of the needle valve relative to the movement amount of the plunger, thereby increasing the number of components and causing securing a housing space to be difficult.

On the other hand, in the solenoid valve VR of the present embodiment, the spool 7R reciprocatably inserted into the cylindrical holder 6R opens and closes the port 6a formed in the holder 6R, thereby opening and closing the solenoid valve VR. Therefore, if a plurality of ports 6a is formed in the circumferential direction of the holder 6R or the port is shaped long in the circumferential direction, the opening degree of the solenoid valve VR can be increased without increasing the stroke amount of the spool 7R which is the valve element of the solenoid valve VR. Therefore, increasing the adjustment width of the opening degree of the solenoid valve VR allows the adjustment width of the compression side damping force to be easily increased.

Further, the above configuration can easily change the relationship between the opening degree of the solenoid valve VR and the energization amount. For example, in the case where the relationship between the opening degree of the solenoid valve VR and the energization amount is set to be a negative proportional relationship and the opening degree is set to be decreased as the energization amount is increased, the port 6a or the annular groove 7b for opening the port 6a may be arranged at a position where the port 6a is opened to the maximum extent when the solenoid valve is not energized.

As described above, the relationship between the opening degree of the solenoid valve VR and the energization amount can be freely changed, and whether the manual valve 41 is installed can be selected in accordance with the relationship. Further, the same configuration as that of the solenoid valve VR of the shock absorber AR on the compression side may be applied to the solenoid valve VL of the shock absorber AL on the extension side, and it is needless to say that the relationship between the solenoid valve VL and the energization amount can be changed appropriately. Further, the method of adjusting the compression side damping force in the shock absorber AL on the extension side may have a structure completely different from that of the shock absorber AR on the compression side, and the configuration of the shock absorber AL on the extension side can be freely changed.

Although preferred embodiments of the present invention have been described in detail above, modifications, variations, and alterations can be made without departing from the scope of the claims. The present application claims priority under Japanese Patent Application No. 2019-038130 filed with the Japan Patent Office on Mar. 4, 2019, the entire contents of which are incorporated herein by reference.

REFERENCE SIGNS LIST

AR Shock absorber
La Extension side chamber
Lb Compression side chamber
VR Solenoid valve
1R Cylinder
2R Piston
3R Piston rod
3a Compression side bypass passage (bypass passage)
4b Discharge passage
6R Holder
6a Port
7R Spool
8R Biasing spring
9R Solenoid
16R Tank
21 Hard-side damping element
21a Leaf valve
21b Orifice
Suction valve
41 Manual valve
50 Soft-side damping element
50a Leaf valve
50b Orifice (large-diameter orifice)

The invention claimed is:

1. A shock absorber, comprising:
a cylinder;
a piston axially movably inserted into the cylinder and partitioning an inside of the cylinder into an extension side chamber and a compression side chamber;
a piston rod connected to the piston and having one end projecting outside the cylinder;
a hard-side damping element for applying resistance to a flow of liquid from the compression side chamber to the extension side chamber;
a solenoid valve capable of changing an opening area of a bypass passage for communicating the compression side chamber and the extension side chamber by bypassing the hard-side damping element; and
a soft-side damping element provided in the bypass passage in series with the solenoid valve, wherein
the hard-side damping element has an orifice and a leaf valve provided in parallel with the orifice, and
the soft-side damping element has a large-diameter orifice having an opening area larger than that of the orifice.

2. The shock absorber according to claim 1, wherein the soft-side damping element has a leaf valve provided in parallel with the large-diameter orifice.

3. The shock absorber according to claim 1, wherein the solenoid valve changes an opening degree in proportion to an energization amount.

4. The shock absorber according to claim 1, wherein the solenoid valve has a cylindrical holder in which a port to be connected to the bypass passage is formed, a spool reciprocatably inserted into the holder and capable of opening and closing the port, a biasing spring for biasing the spool in one of moving directions of the spool, and a solenoid for applying thrust in a direction opposite to a biasing force of the biasing spring to the spool.

5. The shock absorber according to claim 1, comprising:
a tank connected to the extension side chamber; and
a suction valve for permitting only a flow of liquid from the tank to the compression side chamber, wherein
the piston is connected to an other end of the piston rod.

6. The shock absorber according to claim 5, comprising a manual valve capable of changing an opening area of a discharge passage for communicating the compression side chamber and the tank by manual operation.

* * * * *